(12) United States Patent
Yamamoto

(10) Patent No.: US 12,266,117 B2
(45) Date of Patent: Apr. 1, 2025

(54) INFORMATION PROCESSING APPARATUS, SENSING APPARATUS, MOBILE OBJECT, AND METHOD FOR TRACKING A DETECTION TARGET

(71) Applicant: KYOCERA Corporation, Kyoto (JP)

(72) Inventor: Kenji Yamamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 346 days.

(21) Appl. No.: 17/757,875

(22) PCT Filed: Dec. 22, 2020

(86) PCT No.: PCT/JP2020/047906
§ 371 (c)(1),
(2) Date: Jun. 22, 2022

(87) PCT Pub. No.: WO2021/132227
PCT Pub. Date: Jul. 1, 2021

(65) Prior Publication Data
US 2023/0046397 A1 Feb. 16, 2023

(30) Foreign Application Priority Data

Dec. 23, 2019 (JP) .................. 2019-231662

(51) Int. Cl.
*G06T 7/246* (2017.01)
*G01C 5/00* (2006.01)
*G06T 7/70* (2017.01)

(52) U.S. Cl.
CPC .............. *G06T 7/246* (2017.01); *G01C 5/00* (2013.01); *G06T 7/70* (2017.01)

(58) Field of Classification Search
None
See application file for complete search history.

(56) References Cited

U.S. PATENT DOCUMENTS

2009/0102630 A1* 4/2009 Nordlund ................ G01S 11/12
340/436
2014/0010456 A1* 1/2014 Merler .................... G06T 7/277
382/191

(Continued)

FOREIGN PATENT DOCUMENTS

JP H11-321494 A 11/1999

*Primary Examiner* — Akwasi M Sarpong
*Assistant Examiner* — Pawan Dhingra
(74) *Attorney, Agent, or Firm* — Studebaker Brackett PLLC

(57) ABSTRACT

An information processing apparatus includes an input interface, a processor, and an output interface. The input interface obtains observation data obtained from an observation space. The processor detects a detection target included in the observation data. The processor maps coordinates of the detected detection target as coordinates of a detection target in a virtual space, tracks a position and a velocity of a material point indicating the detection target in the virtual space, and maps coordinates of the tracked material point in the virtual space as coordinates in a display space. The processor sequentially observes a size of the detection target in the display space and estimates a size of a detection target at a present time on a basis of observed values of a size of a detection target at the present time and estimated values of a size of a past detection target. The output interface outputs output information based on the coordinates of the material point mapped to the display space and the estimated size of the detection target.

10 Claims, 14 Drawing Sheets

(56) References Cited

U.S. PATENT DOCUMENTS

| | | | |
|---|---|---|---|
| 2014/0119599 A1* | 5/2014 | Dal Mutto | G06F 3/011 |
| | | | 382/103 |
| 2015/0030251 A1* | 1/2015 | Hasegawa | G06V 20/584 |
| | | | 382/195 |
| 2015/0219758 A1* | 8/2015 | Gammenthaler | G01S 13/867 |
| | | | 342/107 |
| 2017/0270689 A1* | 9/2017 | Messely | H04N 7/183 |
| 2019/0156563 A1* | 5/2019 | Wada | H04N 13/271 |

* cited by examiner

FIG. 8

|  | k=0 | ... | k−1 | k | k+1 | k+2 | ... |
|---|---|---|---|---|---|---|---|
| PREDICTED | (NONE) | ... | W(k−2)<br>H(k−2) | W(k−1)<br>H(k−1) | W(k)<br>H(k) | W(k+1)<br>H(k+1) | ... |
| OBSERVED | Wmeans(0)<br>Hmeans(0) | ... | Wmeans(k−1)<br>Hmeans(k−1) | Wmeans(k)<br>Hmeans(k) | (NONE) | Wmeans(k+2)<br>Hmeans(k+2) | ... |
| ESTIMATED | W(0)<br>H(0) | ... | W(k−1)<br>H(k−1) | W(k)<br>H(k) | W(k+1)<br>H(k+1) | W(k+2)<br>H(k+2) | ... |

INFORMATION PROCESSING APPARATUS, SENSING APPARATUS, MOBILE OBJECT, AND METHOD FOR TRACKING A DETECTION TARGET

CROSS REFERENCES TO RELATED APPLICATIONS

The present application claims priority of Japanese Patent Application No. 2019-231662, filed Dec. 23, 2019. The contents of this prior application are incorporated herein by reference in their entirety.

Technical Field

The present disclosure relates to an information processing apparatus, a sensing apparatus, a mobile object, and a method for processing information.

Background Art

An image processing apparatus has been disclosed that detects presence or absence of approaching vehicles, pedestrians, and the like by processing image signals output from a camera, which is provided for a vehicle and captures an image of a scene around the vehicle, and that displays the approaching vehicles, pedestrians, and the like in the image while giving rectangular marks to the vehicles, the pedestrians, and the like (e.g., refer to PTL 1).

CITATION LIST

Patent Literature

PTL 1: Japanese Unexamined Patent Application Publication No. 11-321494

SUMMARY OF INVENTION

An information processing apparatus in the present disclosure includes an input interface, a processor, and an output interface. The input interface is configured to obtain observation data obtained from an observation space. The processor is configured to detect a detection target included in the observation data. The processor is configured to map coordinates of the detected detection target as coordinates of a detection target in a virtual space, track a position and a velocity of a material point indicating the detection target in the virtual space, and map coordinates of the tracked material point in the virtual space as coordinates in a display space. The processor is configured to sequentially observe sizes of the detection target in the display space and estimate a size of a detection target at a present time on a basis of observed values of the size of the detection target at the present time and estimated values of a size of a past detection target. The output interface is configured to output output information based on the coordinates of the material point mapped to the display space and the estimated size of the detection target.

A sensing apparatus in the present disclosure includes a sensor, a processor, and an output interface. The sensor is configured to sense an observation space and obtain observation data regarding a detection target. The processor is configured to detect a detection target included in the observation data. The processor is configured to map coordinates of the detected detection target as coordinates of a detection target in a virtual space, track a position and a velocity of a material point indicating the detection target in the virtual space, and map coordinates of the tracked material point in the virtual space as coordinates in a display space. The processor is configured to sequentially observe sizes of the detection target in the display space and estimate a size of a detection target at a present time on a basis of observed values of the size of the detection target at the present time and estimated values of a size of a past detection target. The output interface is configured to output output information based on the coordinates of the material point mapped to the display space and the estimated size of the detection target.

A mobile object in the present disclosure includes a sensing apparatus. The sensing apparatus includes a sensor, a processor, and an output interface. The sensor is configured to sense an observation space and obtain observation data regarding a detection target. The processor is configured to detect a detection target included in the observation data. The processor is configured to map coordinates of the detected detection target as coordinates of a detection target in a virtual space, track a position and a velocity of a material point indicating the detection target in the virtual space, and map coordinates of the tracked material point in the virtual space as coordinates in a display space. The processor is configured to sequentially observe sizes of the detection target in the display space and estimate a size of a detection target at a present time on a basis of observed values of the size of the detection target at the present time and estimated values of a size of a past detection target. The output interface is configured to output output information based on the coordinates of the material point mapped to the display space and the estimated size of the detection target.

A method for processing information in the present disclosure includes obtaining observation data obtained from an observation space and detecting a detection target included in the observation data. The method includes mapping coordinates of the detected detection target as coordinates of a detection target in a virtual space, tracking a position and a velocity of a material point indicating the detection target in the virtual space, and mapping coordinates of the tracked material point in the virtual space as coordinates in a display space. The method includes sequentially observing a size of the detection target in the display space and estimating a size of a detection target at a present time on a basis of observed values of the size of the detection target at the present time and estimated values of a size of a past detection target. The method includes outputting output information based on the coordinates of the material point mapped to the display space and the estimated size of the detection target.

BRIEF DESCRIPTION OF DRAWINGS

FIG. 8 is a diagram illustrating an example of estimation of a size of a subject image.

DESCRIPTION OF EMBODIMENTS

Figure 1:
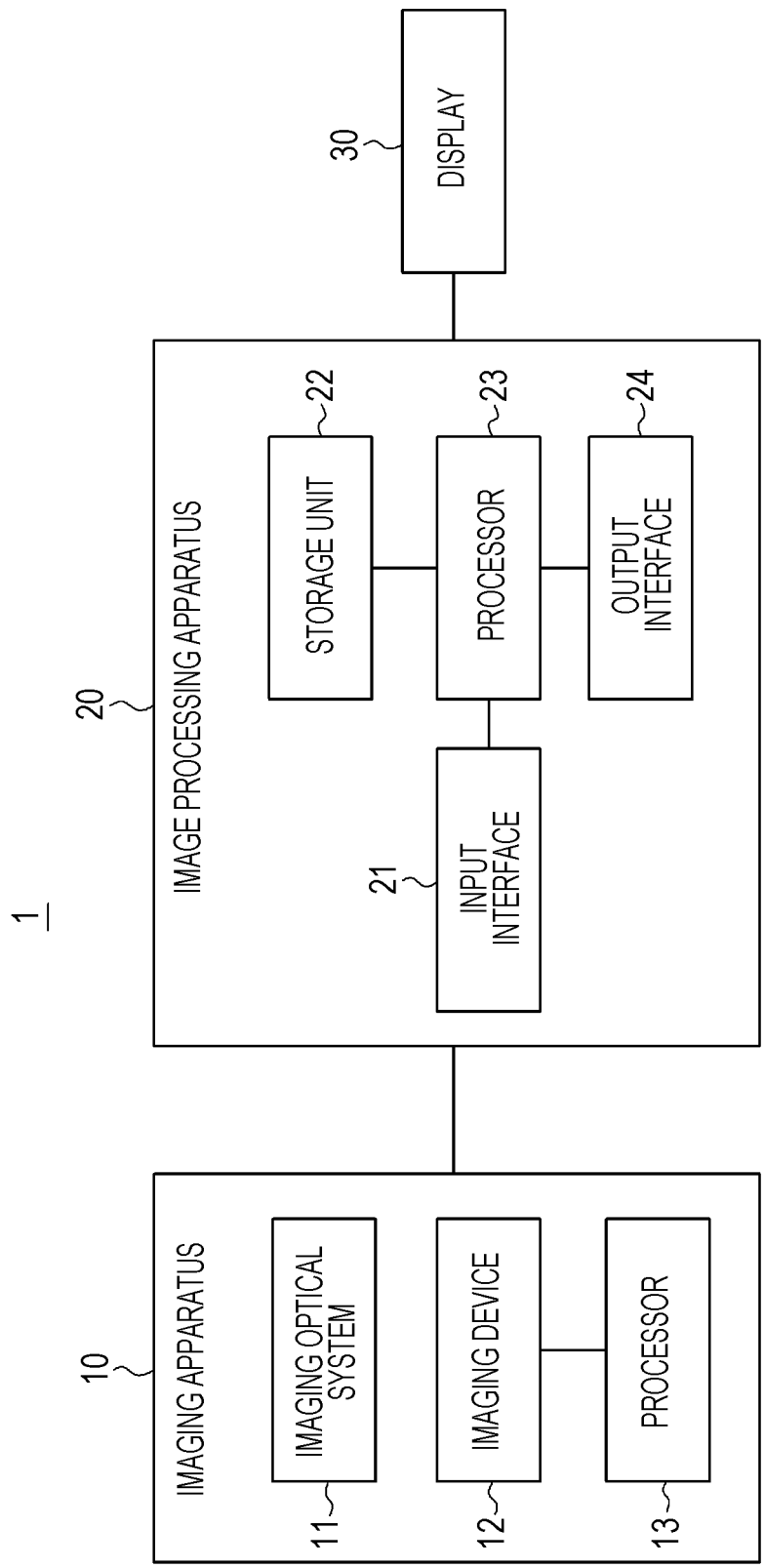
FIG. 1 is a block diagram illustrating a schematic configuration of an image processing system including an image processing apparatus, which is an information processing apparatus according to an embodiment.

In an information processing apparatus mounted on a vehicle or the like, positions and sizes of images of approaching vehicles, pedestrians, and the like in an image of a display space change over time as relative positions of the approaching vehicles, pedestrians, and the like and the vehicle change. Tracking positions of approaching vehicles, pedestrians, and the like accurately while recognizing sizes of detection targets, therefore, causes a large processing load, which can lead to a tracking error and/or a decrease in accuracy.

The information processing apparatus is preferably capable of accurately tracking detection targets while reducing a processing load.

An embodiment of the present disclosure will be described hereinafter with reference to the drawings. The drawings used in the following description are schematic diagrams. Dimensions, proportions, and the like in the drawings do not necessarily match those of reality.

Figure 2:
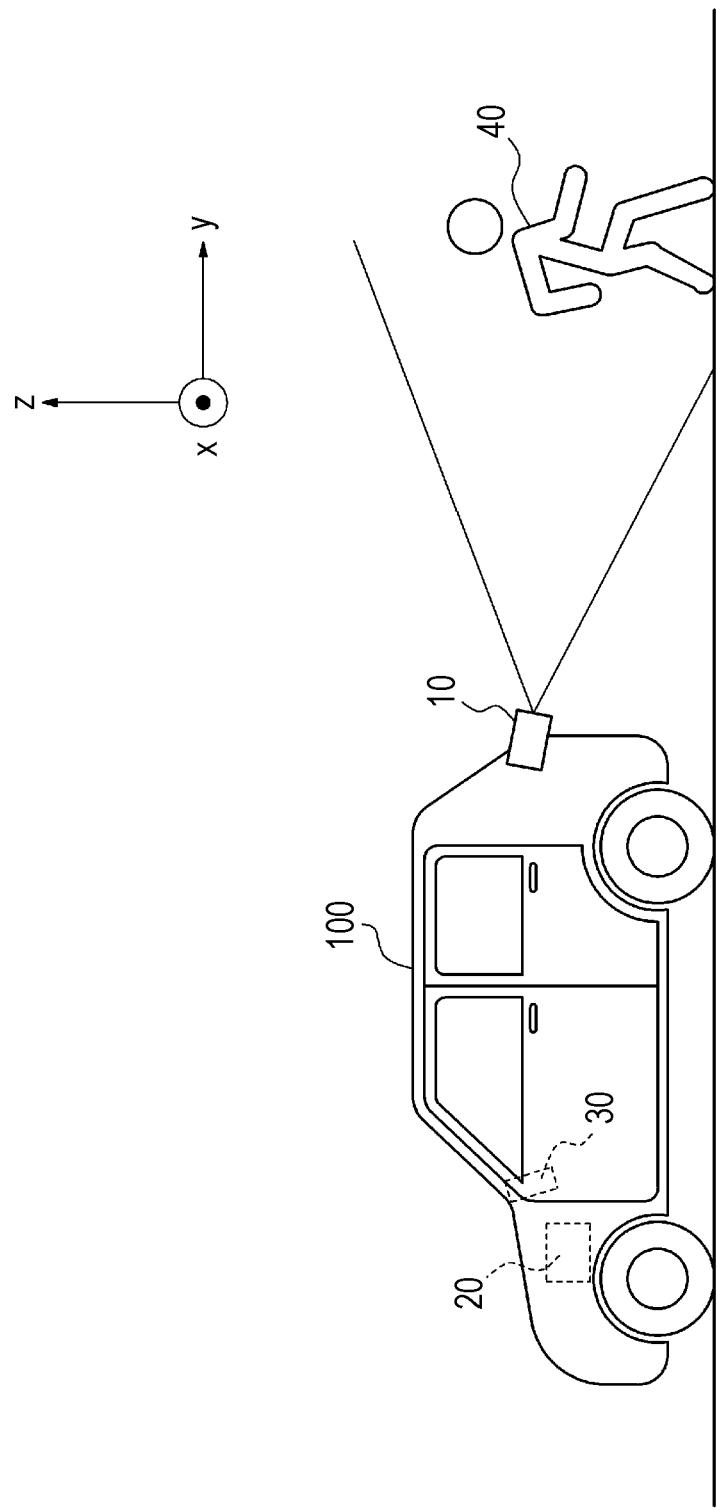
FIG. 2 is a diagram illustrating a vehicle on which the image processing system illustrated in FIG. 1 is mounted and a pedestrian.

An image processing apparatus 20, which is an example of an information processing apparatus according to the embodiment of the present disclosure, is included in an image processing system 1. The image processing system 1 includes an imaging apparatus 10, the image processing apparatus 20, and a display 30. The imaging apparatus 10 is an example of a sensor that senses an observation space. As illustrated in FIG. 2, the image processing system 1 is mounted on a vehicle 100, which is an example of a mobile object.

As illustrated in FIG. 2, in the present embodiment, an x-axis direction in real space coordinates is a width direction of the vehicle 100 provided with the imaging apparatus 10. Real space is an observation space from which observation data is to be obtained. A y-axis direction is a direction in which the vehicle 100 backs up. The x-axis direction and the y-axis direction are directions parallel to a road surface on which the vehicle 100 is located. A z-axis direction is a direction perpendicular to the road surface. The z-axis direction can also be referred to as a vertical direction. The x-axis direction, the y-axis direction, and the z-axis direction are perpendicular to one another. The x-axis direction, the y-axis direction, and the z-axis direction need not be defined in this manner. The x-axis direction, the y-axis direction, and the z-axis direction are interchangeable.

[Imaging Apparatus]

The imaging apparatus 10 includes an imaging optical system 11, an imaging device 12, and a processor 13.

The imaging apparatus 10 can be mounted on the vehicle 100 at one of various positions. The imaging apparatus 10 may be a front camera, a left-side camera, a right-side camera, a rear camera, or the like, but is not limited to these. The front camera, the left-side camera, the right-side camera, and the rear camera are mounted on the vehicle 100 in such a way as to be able to capture images of scenes ahead of, to the left of, to the right of, and behind the vehicle 100, respectively. In the embodiment that will be described hereinafter as an example, the imaging apparatus 10 is mounted on the vehicle 100 with an optical axis direction thereof pointing downward as illustrated in FIG. 2 so that an image of a scene behind the vehicle 100 can be captured.

As illustrated in FIG. 1, the imaging apparatus 10 includes the imaging optical system 11, the imaging device 12, and the processor 13. The imaging optical system 11 includes one or more lenses. The imaging device 12 may be a CCD image sensor (charge-coupled device image sensor), a CMOS image sensor (complementary MOS image sensor), or the like. The imaging device 12 converts a subject image formed by the imaging optical system 11 on an imaging surface of the imaging device 12 into an electrical signal. A subject image is an image of a subject to be detected. The imaging device 12 can capture a moving image with a certain frame rate. A moving image is an example of observation data. Still images constituting a moving image are called frames. The number of images that can be captured per second is called a frame rate. The frame rate may be, for example, 60 fps (frames per second), 30 fps, or the like.

The processor 13 controls the entirety of the imaging apparatus 10 and performs various types of image processing on moving images output from the imaging device 12. The image processing performed by the processor 13 can include any type of processing such as distortion correction, brightness adjustment, contrast adjustment, or gamma correction.

The processor 13 may be achieved by one or a plurality of processors. The processor 13 includes, for example, one or more circuits or units configured to perform one or more data calculation procedures or processes by executing instructions stored in a related memory. The processor 13 may be one or more processors, microprocessors, microcontrollers, application-specific integrated circuits (ASICs), digital signal processors (DSPs), programmable logic devices (PLDs), field-programmable gate arrays (FPGAs), any combination of these devices or components, or a combination of other known devices or components.

[Image Processing Apparatus]

The image processing apparatus 20 can be mounted on the vehicle 100 at any position. The image processing apparatus 20 includes an input interface 21, a storage unit 22, a processor 23, and an output interface 24.

The input interface 21 is configured to be communicable with the imaging apparatus 10 through wired or wireless communication means. The input interface 21 obtains moving images from the imaging apparatus 10. The input interface 21 may employ a transmission method used for image signals transmitted by the imaging apparatus 10. The input interface 21 can also be referred to as an input unit or an obtaining unit. The imaging apparatus 10 and the input interface 21 may be connected to each other by a vehicle communication network such as a CAN (control area network).

The storage unit 22 is a storage device storing data and programs necessary for processing performed by the processor 23. For example, the storage unit 22 temporarily stores a moving image obtained from the imaging apparatus 10. For example, the storage unit 22 sequentially stores data generated as a result of processing performed by the processor 23. The storage unit 22 may be achieved using, for example, a semiconductor memory, a magnetic memory, an optical memory, and/or the like. The semiconductor memory may be a volatile memory, a nonvolatile memory, or the like. The magnetic memory may be, for example, a hard disk, a magnetic tape, or the like. The optical memory may be, for example, a CD (compact disc), a DVD (digital versatile disc), a BD (Blu-ray (registered trademark) disc), or the like.

The processor 23 controls the entirety of the image processing apparatus 20. The processor 23 recognizes a subject image included in a moving image obtained through the input interface 21. The processor 23 maps coordinates of the recognized subject image as coordinates of a subject 40 in a virtual space and tracks a position and a velocity of a material point indicating the subject 40 in the virtual space. A material point is a point that has mass but that does not have volume. A virtual space is used by a processing device, such as the processor 23, to describe motion of objects. In the present embodiment, a virtual space is a two-dimensional space whose value of a z-axis direction is a certain fixed value in a coordinate system defined by an x-axis, a y-axis, and a z-axis of real space. The processor 23 maps coordinates of a tracked material point in virtual space as coordinates in an image space for displaying a moving image. An image space is an example of a display space. A display space is a space where a detection target is represented in two dimensions in order to allow a user to recognize the detection target or another apparatus to use the detection target. The processor 23 sequentially observes sizes of subject images in an image space and estimates a size of a current subject image 42 on the basis of an observed value of the size of the current subject image and an estimated value of a size of a past subject image. Details of the processing performed by the processor 23 will be described later. As with the processor 13 of the imaging apparatus 10, the processor 23 may include a plurality of processors. Alternatively, as with the processor 13, the processor 23 may be achieved by combining devices of a plurality of types together.

The output interface 24 is configured to output an output signal, which is output information, from the image processing apparatus 20. The output interface 24 can also be referred to as an output unit. The output interface 24 can output an output signal based on coordinates of a material point mapped to an image space for displaying a moving image and an estimated size of a subject image in the image space. For example, the output interface 24 can output, to the display 30, an image output from the imaging apparatus 10 while superimposing an image element indicating a size of a subject image upon the image. The image element indicating a size of a subject image is, for example, a bounding box. A bounding box is a rectangular frame surrounding a subject image. The output interface 24 may directly output coordinates of a material point and a size of a subject image as an output signal.

The output interface 24 may include a physical connector or a wireless transmitter. In one of a plurality of embodiments, the output interface 24 is connected to a network of the vehicle 100, such as a CAN. The output interface 24 can be connected to the display 30, a control device of the vehicle 100, an alarming device, and the like over the communication network such as a CAN. Information output from the output interface 24 is used in the display 30, the control device, and the alarming device.

The display 30 can display a moving image output from the image processing apparatus 20. The display 30 may have a function of, when receiving information regarding coordinates of a material point indicating a position of a subject image and a size of the subject image from the image processing apparatus 20, generating an image element corresponding to the information and superimposing the image element upon a moving image. The display 30 can be achieved by one of various types of apparatuses. For example, the display 30 can be achieved by a liquid crystal display (LCD), an organic electroluminescence (EL) display, an inorganic EL display, a plasma display panel (PDP), a field-emission display (FED), an electrophoretic display, a twisting ball display, or the like.

[Process for Tracking Subject Image]

Next, details of a method for processing an image performed by the image processing apparatus 20 will be described with reference to a flowchart of FIG. 3. The method for processing an image is an example of a method for processing information. The image processing apparatus 20 may be configured to achieve processing that is performed by the processor 23 and that will be described hereinafter by reading a program stored in a non-transitory computer-readable medium. The non-transitory computer readable medium may be a magnetic storage medium, an optical storage medium, a magneto-optical storage medium, or a semiconductor storage medium, but is not limited to these. The magnetic storage medium may be a magnetic disk, a hard disk, or a magnetic tape. The optical storage medium may be an optical disc such as a CD (compact disc), a DVD, or a Blu-ray (registered trademark) disc. The semiconductor storage medium may be a ROM (read-only memory), an EEPROM (electrically erasable programmable read-only memory), a flash memory, or the like.

Figure 3:
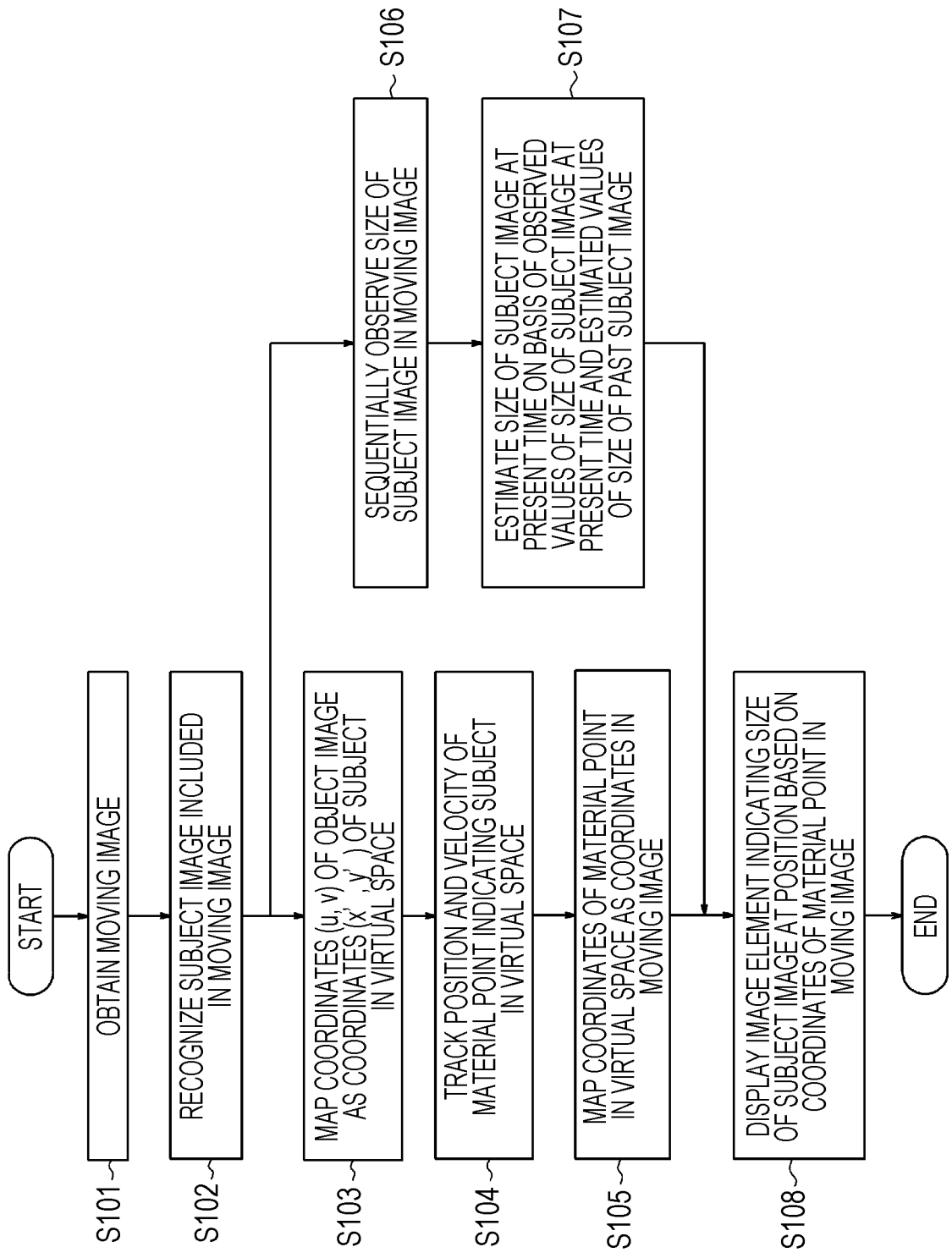
FIG. 3 is a flowchart illustrating an example of a process for tracking a subject image in a moving image.

The flowchart of FIG. 3 illustrates a process performed by the processor 23 while the processor 23 is obtaining sequential frames of a moving image. Each time the processor 23 of the image processing apparatus 20 obtains a frame of a moving image, the processor 23 tracks a position and a size of a subject image 42 in accordance with the flowchart of FIG. 3. It is assumed in the following description that, as illustrated in FIG. 2, the imaging apparatus 10 provided at a rear end of the vehicle 100 captures images of a pedestrian who is a subject 40. The subject 40 is not limited to a pedestrian, and may be one of various targets including vehicles running on a road and obstacles on a road.

Figure 4:
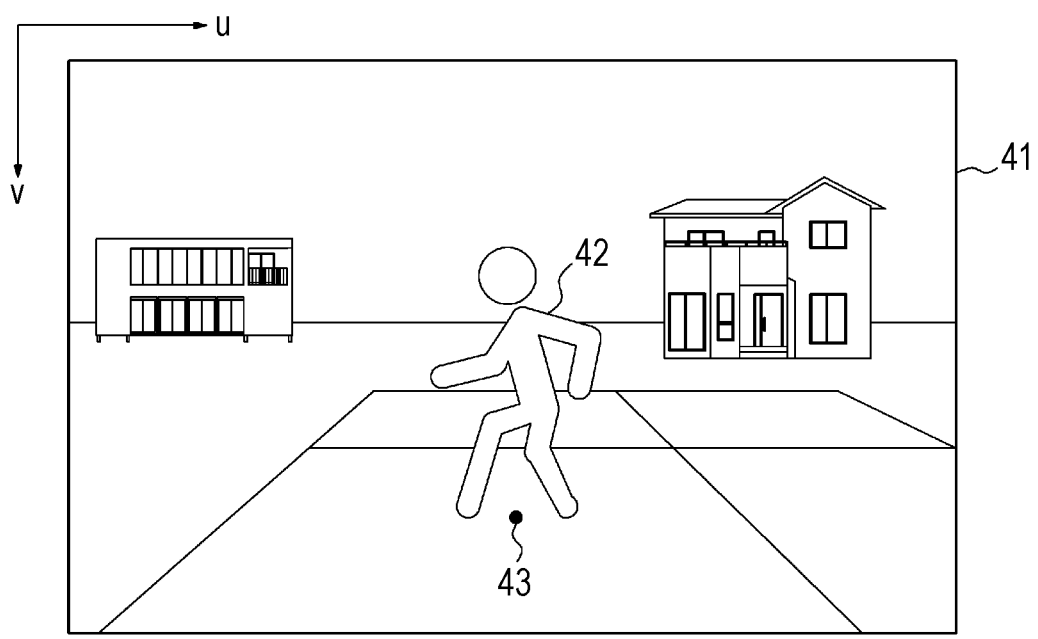
FIG. 4 is a diagram illustrating an example of a subject image in a moving image.

The processor 23 obtains each of frames of a moving image from the imaging apparatus 10 through the input interface 21 (step S101). FIG. 4 illustrates an example of a frame of a moving image. In the example illustrated in FIG. 4, a subject image 42 of a subject 40, who is a pedestrian crossing behind the vehicle 100, is displayed in a two-dimensional image space 41 defined by a u-v coordinate system. A u-coordinate is a coordinate in a horizontal direction of the image. A v-coordinate is a coordinate in a vertical direction of the image. In FIG. 4, an origin of the u-v coordinates is a point on an upper-left corner of the image space 41. A positive direction of the u-coordinate is a rightward direction. A positive direction of the v-coordinate is a downward direction.

The processor 23 recognizes the subject image 42 in each of the frames of the moving image through image recognition (step S102). As a result, the processor 23 detects the subject 40. A method for recognizing the subject image 42 may be one of various known methods. For example, the method for recognizing the subject image 42 may be a method based on recognition of shapes of objects such as vehicles and pedestrians, a method based on template matching, a method in which feature values are calculated from an image and used for matching, or the like. In the calculation of feature values, a function approximator capable of learning input-output relationships may be used. The function approximator capable of learning input-output relationships may be a neural network.

The processor 23 maps coordinates (u, v) of the subject image 42 in the image space 41 as coordinates (x', y') of the subject 40 in a virtual space (step S103). In general, coordinates (u, v) in the image space 41, which are two-dimensional coordinates, cannot be transformed into coordinates (x, y, z) in real space. By identifying height in real space and fixing the z-coordinate at a certain value, however, the coordinates (u, v) in the image space 41 can be mapped as the coordinates (x', y') in the two-dimensional virtual space corresponding to coordinates (x, y, $z_0$) ($z_0$ is a fixed value) in real space. This will be described hereinafter with reference to FIGS. 4 and 5.

In FIG. 4, a representative point 43 located at a center of a bottom of the subject image 42 is identified. For example, the representative point 43 may be at a lowest position of an area occupied by the subject image 42 in terms of the v-coordinate and a central position of the area in terms of the u-coordinates in the image space 41. The representative point 43 is assumed to be at a position at which the subject 40 corresponding to the subject image 42 is in contact with a road surface or the ground.

Figure 5:
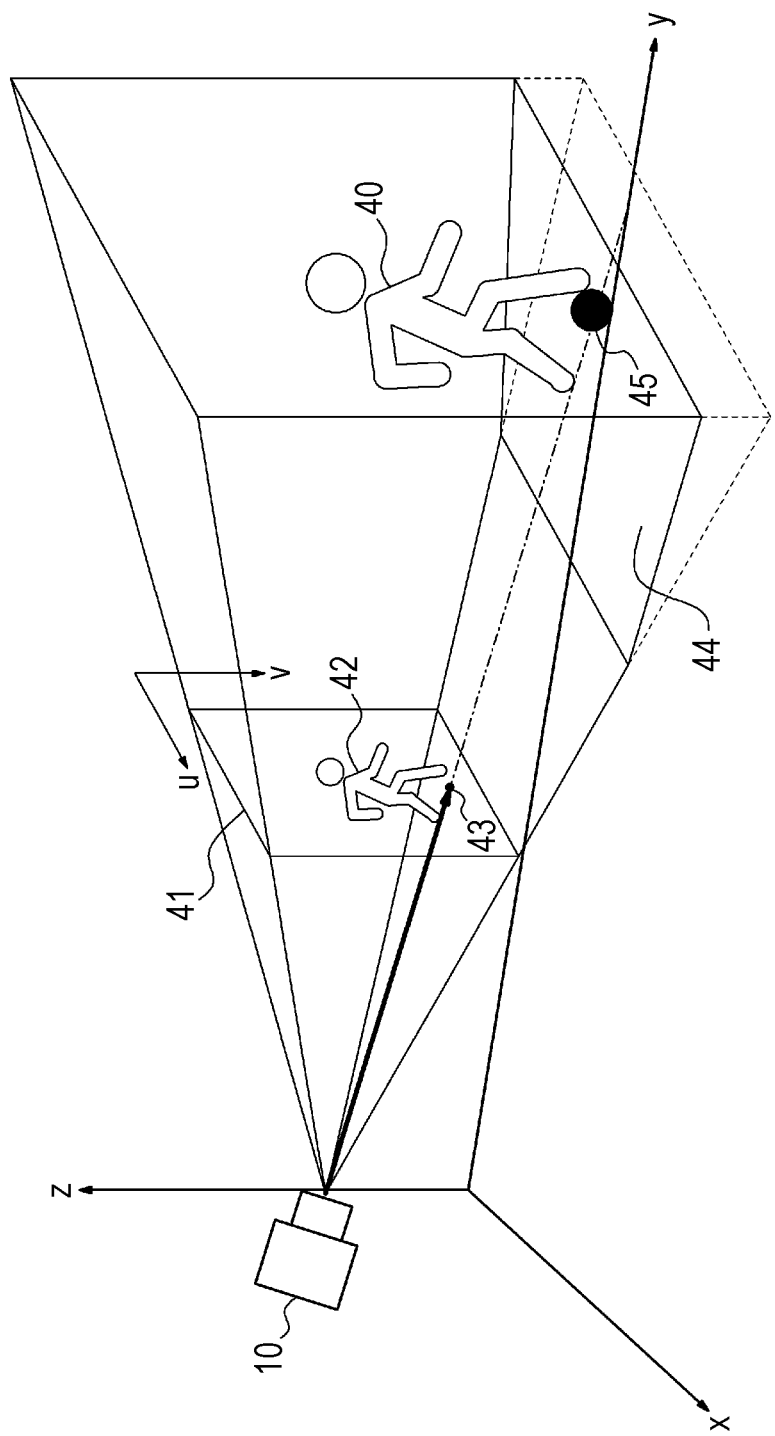
FIG. 5 is a diagram illustrating a relationship between a subject in real space, the subject image in the moving image, and a material point in a virtual space.

FIG. 5 illustrates a relationship between the subject 40 in three-dimensional real space and the subject image 42 in the two-dimensional image space 41. When internal parameters of the imaging apparatus 10 are known, a direction from a center of the imaging optical system 11 of the imaging apparatus 10 to the coordinates (x, y, z) in real space corresponding to the coordinates (u, v) in the image space 41 can be calculated on the basis of the coordinates (u, v). The internal parameters of the imaging apparatus 10 include information such as a focal distance and distortion of the imaging optical system 11 and a pixel size of the imaging device 12. In real space, a point at which a straight line toward a direction corresponding to the representative point 43 in the image space 41 intersects with a reference plane 44, where z=0, is defined as a material point 45 of the subject 40. The reference plane 44 corresponds to a road surface or the ground on which the vehicle 100 is located. The material point 45 has three-dimensional coordinates (x, y, 0). When a two-dimensional space whose z=0 is used as a virtual space, therefore, coordinates of the material point 45 can be represented as (x', y'). The coordinates (x', y') of the material point 45 in the virtual space correspond to coordinates (x, y) of a certain point on the subject 40 in an x-y plane (z=0) when the subject 40 is viewed in real space in a direction along the z-axis. The certain point corresponds to the material point 45.

Figure 6:
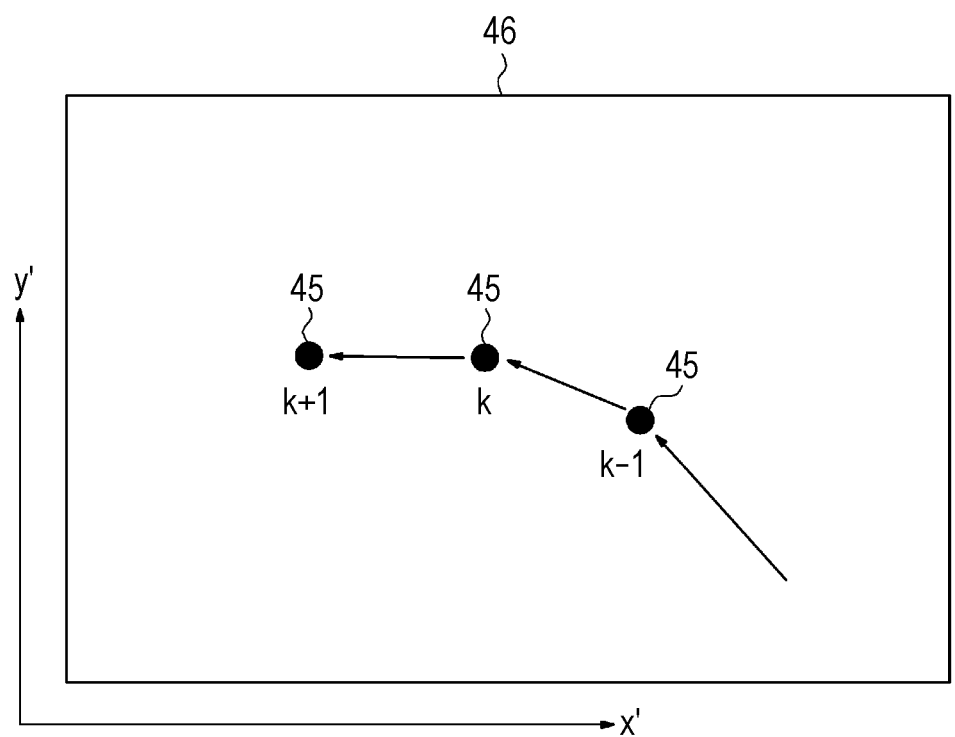
FIG. 6 is a diagram illustrating an example of movement of the material point in the virtual space.

As illustrated in FIG. 6, the processor 23 tracks, in a virtual space 46, a position (x', y') and a velocity ($v_{x'}$, $v_{y'}$) of the material point 45, which has been mapped to the virtual space 46 from the representative point 43 of the subject image 42 (step S104). Since the material point 45 has this information, namely the position (x', y') and the velocity ($v_{x'}$, $v_{y'}$), the processor 23 can predict ranges of the position (x', y') of the material point 45 in subsequent frames. The processor 23 can recognize a material point 45 located within a range predicted for a next frame as the material point 45 corresponding to the subject image 42 that is being tracked. Each time the processor 23 receives a new frame, the processor 23 sequentially updates the position (x', y') and the velocity ($v_{x'}$, $v_{y'}$) of the material point 45.

Estimation using a Kalman filter based on a state space model, for example, can be employed for the tracking of the material point 45. By performing prediction/estimation using the Kalman filter, robustness against no detection, erroneous detection, and the like of the subject 40 to be tracked improve. In general, it is difficult to describe the subject image 42 in the image space 41 with an appropriate model for describing motion. It has therefore been difficult to estimate the subject image 42 in the image space 41 easily and accurately. Because a model for describing motion in real space can be applied with the image processing apparatus 20 according to the present embodiment by mapping the subject image 42 as the material point 45 in real space, accuracy of tracking the subject image 42 improves. In addition, by handling the subject 40 as the material point 45 without volume, simple and easy tracking can be achieved.

Each time the processor 23 estimates a new position of the material point 45, the processor 23 maps the coordinates of the material point 45 in the virtual space 46 as coordinates (u, v) in the image space 41 (step S105). The material point 45 at the coordinates (x', y') in the virtual space 46 can be mapped to the image space 41 as a point at the coordinates (x', y', 0) in real space. The coordinates (x', y', 0) in real space can be mapped as the coordinates (u, v) in the image space 41 of the imaging apparatus 10 using a known method.

The processor 23 can perform processing in steps S106 and S107, which will be described hereinafter, in parallel with the above-described processing in steps S103 to S105. The processor 23 may perform either the processing in steps S103 to S105 or the processing in steps S106 and S107 before or after the other processing.

The processor 23 observes a size of the subject image 42 in the image space in which the moving image recognized in step S102 is displayed (step S106). The size of the subject image 42 includes width and height of the subject image 42 in the image space. The size of the subject image 42 can be represented, for example, in pixels.

The processor 23 estimates a size of a subject image 42 at a present time on the basis of observed values of the size of the subject image 42 at the present time and estimated values of a size of a past subject image 42 (step S107). Here, the "subject image at the present time" refers to a subject image based on an image of a latest frame obtained from the imaging apparatus 10. A "preceding subject image" refers to a subject image based on an image of a frame immediately before a latest frame obtained from the imaging apparatus 10. The processor 23 sequentially observes sizes of subject images 42 in images of frames obtained as a moving image. In the present application, observation at the present time will also be referred to as "current observation", and observation performed immediately before the current observation will also be referred to as "previous observation". In the present application, "present time" and "current", and "preceding" and "previous", are substantially synonymous.

Figure 7:
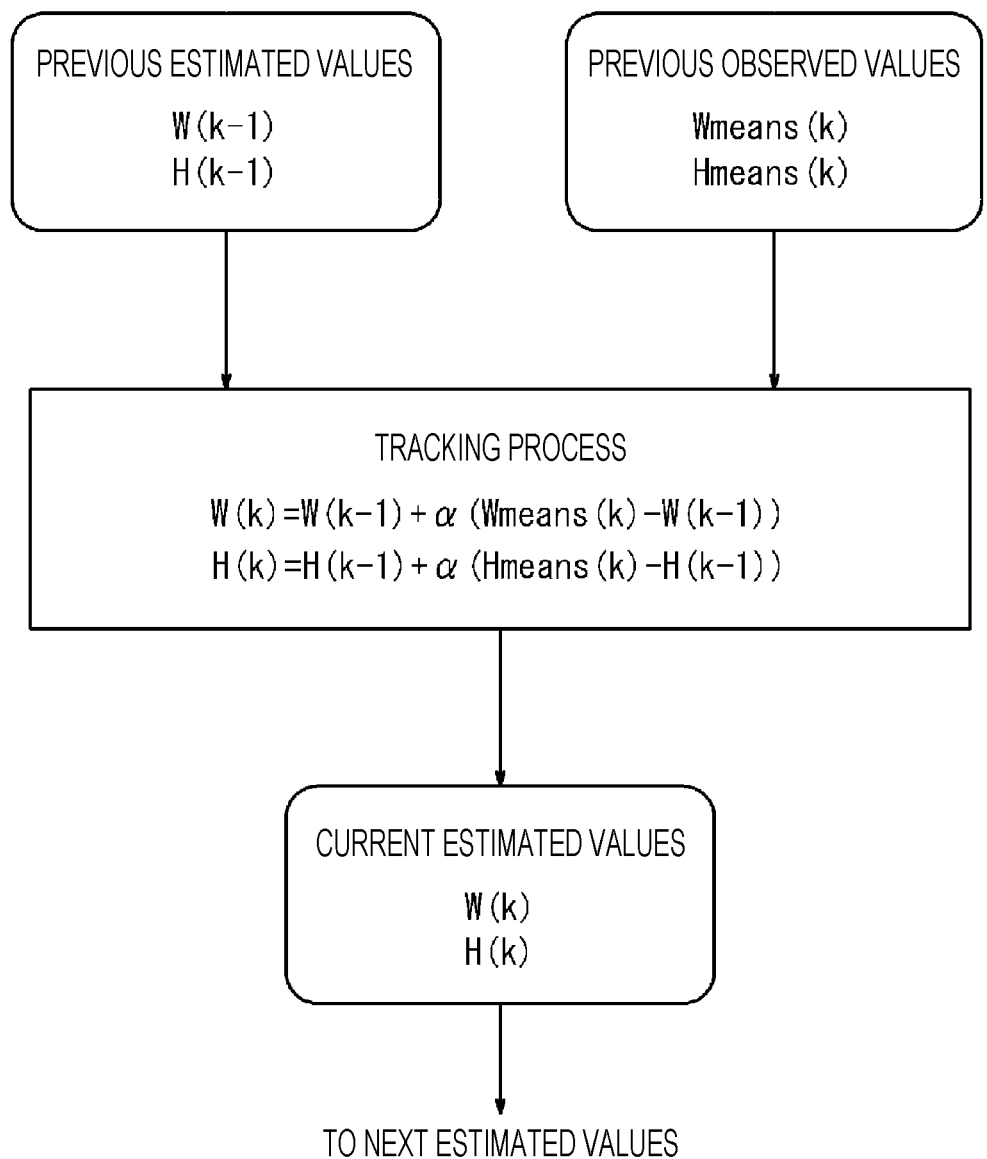
FIG. 7 is a diagram illustrating a method for tracking a size of a subject image in a moving image.

As illustrated in FIG. 7, the processor 23 performs the tracking on the basis of an estimated value W(k−1) of a previous width estimated as a result of the previous observation and an observed value Wmeans(k) of a current width obtained as a result of the current observation, and calculates an estimated value W(k) of the current width. The processor 23 performs the tracking process on the basis of an estimated value H(k−1) of a previous height estimated as a result of the previous observation and an observed value Hmeans (k) of a current height obtained as a result of the current observation, and calculates an estimated value H(k) of the current height. Here, k corresponds to one of serial numbers given to the frames included in the moving image. The current observation is performed for a k-th frame. The width and the height of the subject image 42 can be estimated on the basis of the following expressions (1) and (2).

$$W(k)=W(k-1)+\alpha(W\text{means}(k)-W(k-1)) \quad (1)$$

$$H(k)=H(k-1)+\alpha(H\text{means}(k)-H(k-1)) \quad (2)$$

A parameter α falls within a range of 0≤α≤1. The parameter α is set in accordance with reliability of observed values Wmeans (k) and Hmeans (k) of the width and the height, respectively. When α is 0, the estimated values W(k) and H(k) of the current width and the current height are the same as the estimated values W(k−1) and H(k−1) of the previous width and the previous height, respectively. When α=0.5, the estimated values W(k) and H(k) of the current width and the current height are averages of the estimated values W(k−1) and H(k−1) of the previous width and the previous height and the observed values Wmeans (k) and Hmeans (k) of the current width and the current height, respectively. When α=1, the estimated values W(k) and H(k) of the current width and the current height are the observed values Wmeans (k) and Hmeans (k) of the current width and the current height, respectively.

The processor 23 may dynamically adjust the parameter α during the tracking. For example, the processor 23 may estimate accuracy of recognizing the subject image 42 included in the moving image and dynamically adjust the parameter α on the basis of the estimated accuracy of recognition. For example, the processor 23 may calculate values of image brightness, contrast, and the like from the moving image. If the image is dark or the contrast is low, the processor 23 may determine that the accuracy of recognizing the subject image 42 is low and decrease the parameter α. The processor 23 may adjust the parameter α in accordance with velocity of movement of the subject image 42 in the moving image. If the subject image 42 moves fast in the moving image, for example, the processor 23 may increase the parameter α compared to when the subject image 42 moves slowly, in order to follow the movement of the subject image 42.

The processor 23 might not be able to detect observed values of the size of the subject image 42 at the present time from the current frame in step S102. When two subject images 42 overlap each other in an image space for displaying a moving image, for example, the processor 23 might not be able to detect a size of each of the subject images 42. In this case, the processor 23 may estimate a size of each of subject images 42 at the present time on the basis of only estimated values of a size of a past subject image 42. For example, the processor 23 may determine the estimated values W(k−1) and H(k−1) of the preceding width and the preceding height as the estimated values W(k) and H(k) of the width and the height at the present time, respectively.

When the processor 23 cannot detect observed values of the size of the subject image 42 at the present time, the processor 23 may take into consideration estimated values W(k−j) and H(k−j) (j≥2) of the width and the height of a subject image 42 included in an older frame. For example, the processor 23 may estimate the estimated values W(k) and H(k) of the width and the height of the subject image 42 at the present time using the following expressions (3) and (4) and a parameter β, which falls within a range of 0≤β≤1.

$$W(k)=W(k-1)+\beta(W(k-1)-W(k-2)) \quad (3)$$

$$H(k)=H(k-1)+\beta(H(k-1)-H(k-2)) \quad (4)$$

When the size of the subject image 42 at the present time cannot be obtained, the size of the subject image 42 at the present time can thus be estimated by reflecting estimated values of a size of a subject image 42 older than a preceding subject image 42.

An example of a process for tracking the size of the subject image 42 will be described with reference to FIG. 8. As initial values (k=0) for estimating the subject image 42, the processor 23 sets observed values Wmeans (0) and Hmeans (0) of an initial width and an initial height as estimated values W(0) and H(0) of the width and the height, respectively. In each of subsequent frames, the processor 23 sets estimated values W(k−1) and H(k−1) of the width and the height of a previous frame as predicted values W(k−1) and H(k−1) of the width and the height of the frame. The processor 23 estimates estimated values W(k) and H(k) of the width and the height of the frame using the predicted values W(k−1) and H(k−1) of the width and the height and observed values Wmeans (k) and Hmeans (k) of the width and the height of the frame.

It is assumed in FIG. 8 that observed values are not obtained in a (k+1)th frame. In this case, the processor 23 may make α=0 in expressions (1) and (2) and use predicted values W(k) and H(k) of the width and the height of a subject image 42 in a preceding frame as estimated values W(k+1) and H(k+1) of the width and the height of a subject image 42 in the (k+1)th frame. Alternatively, the processor 23 may calculate the estimated values W(k+1) and H(k+1) of the width and the height of a subject image 42 in the (k+1)th frame using expressions (3) and (4). In this case, estimated values W(k−1) and H(k−1) of the width and the height of a frame before the preceding frame and estimated values W(k) and H(k) of the width and the height of the preceding frame are reflected by the estimated values W(k+1) and H(k+1).

The processor 23 can thus stably calculate estimated values W(k) and H(k) of the width and the height of a subject image 42 even when observed values of the width and the height of the subject image 42 cannot be detected from a moving image in the image space 41.

Figure 9:
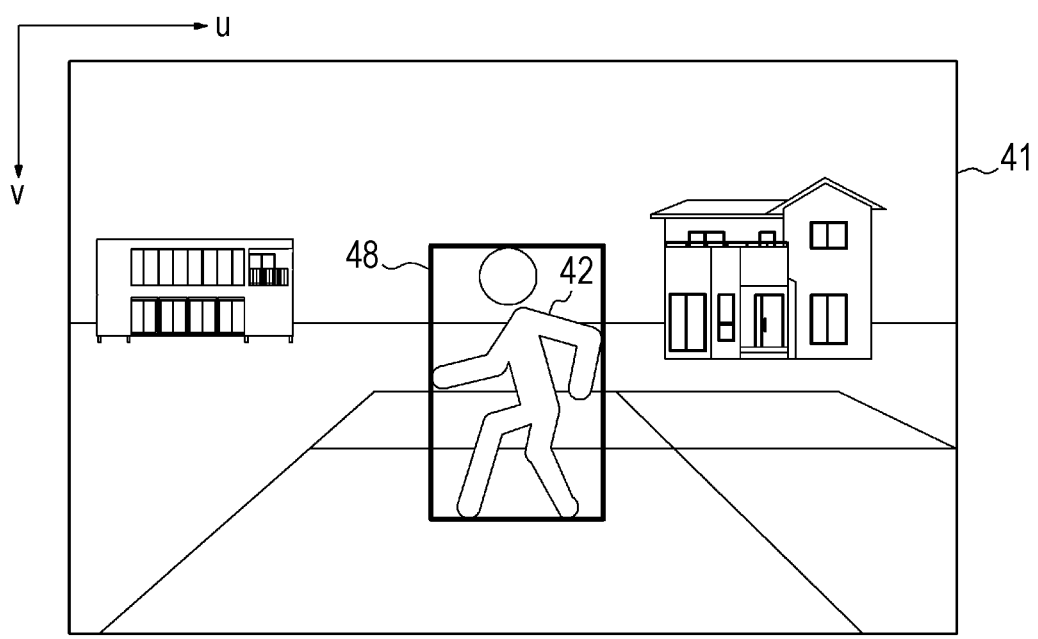
FIG. 9 illustrates an example of an image in which an image element (bounding box) is displayed on a moving image.

After the coordinates (u, v) are obtained in step S105 by mapping the material point 45 at the present time to the image space 41 and the size of the subject image 42 is estimated in step S107, the processor 23 causes the process to proceed to step S108. In step S108, the processor 23 generates, as illustrated in FIG. 9, an image in which an image element 48 indicating the estimated size of an object image is superimposed at a position based on the coordinates of the material point in the image space for displaying the moving image. The image element 48 is, for example, a bounding box. The bounding box is a rectangular frame surrounding the subject image 42. The processor 23 displays, on the display 30 through the output interface 24, a moving image including the subject image 42 to which the image element 48 has been attached. As a result, a user of the image processing system 1 can visually recognize the subject image 42 that has been recognized by the image processing apparatus 20 and that is highlighted by the image element 48.

According to the present embodiment, the image processing apparatus 20 tracks a position of a subject image 42 in the virtual space 46 as a material point 45 and the size of the subject image 42 in the image space 41, and then displays results of the tracking on the display 30 while combining the results together. As a result, the image processing apparatus 20 can reduce a processing load while accurately tracking the position and the size of the subject image 42.

According to the present embodiment, since the image processing apparatus 20 uses the Kalman filter to track a material point 45 corresponding to a position of a subject image 42, the position of the subject image 42 can be accurately estimated even when the image processing apparatus 20 has a large error in recognition of the position of the subject image 42.

According to the present embodiment, the image processing apparatus 20 sequentially observes sizes of subject images 42 and estimates a size of a current subject image 42 on the basis of observed values of the size of the current subject image 42 and estimated values of a size of a past subject image 42. As a result, the image processing apparatus 20 can accurately estimate the size of the subject image 42 even when an error in the observed size of the subject image 42 is large. In addition, since the image processing apparatus 20 calculates estimated values of the current subject image 42 while reflecting the estimated values of the past subject image 42 using the parameters α and β, flickering of a displayed image element 48 and the like can be suppressed even when observed values at each time point fluctuate due to an error. As a result, the image processing apparatus 20 can provide clear images for the user.

[Imaging Apparatus Having Tracking Function]

Figure 10:
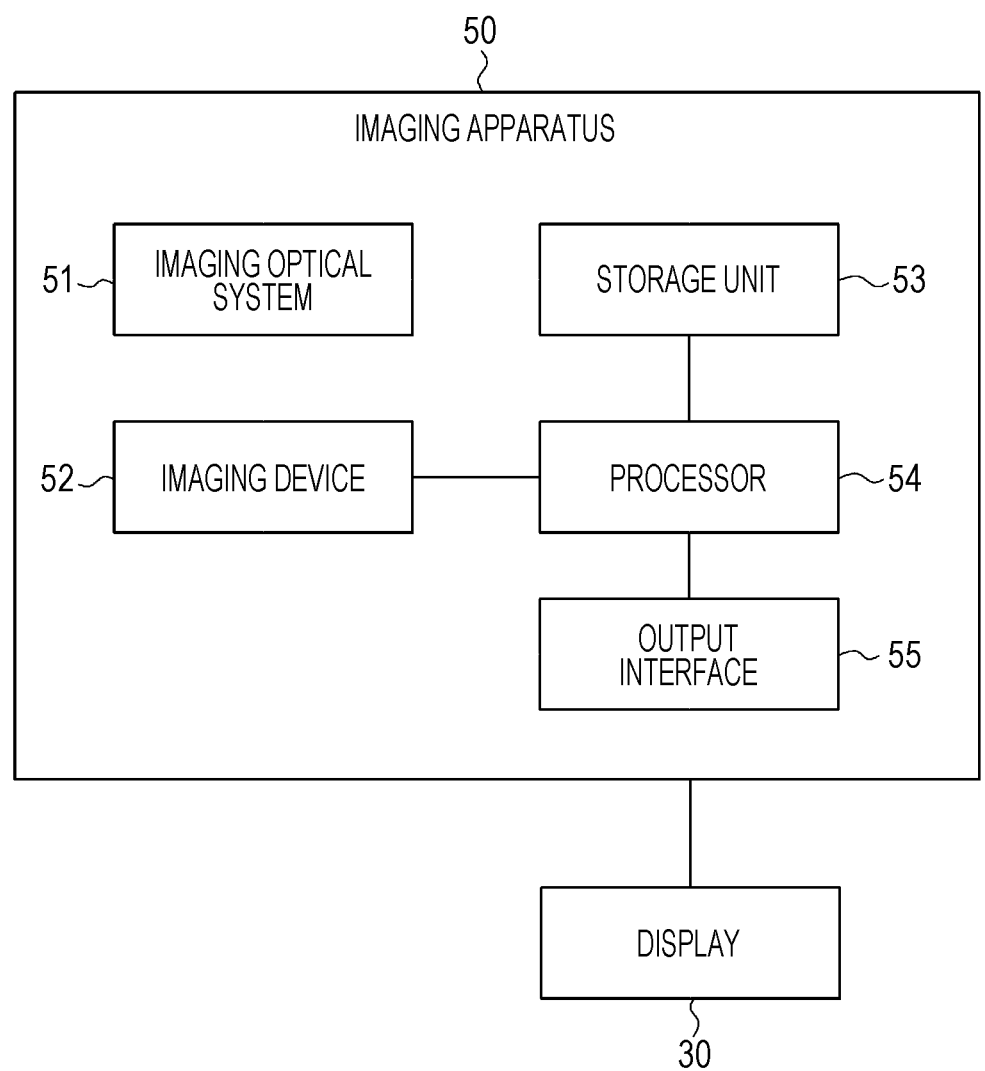
FIG. 10 is a block diagram illustrating a schematic configuration of an imaging apparatus, which is a sensing apparatus according to the embodiment.

The functions of the image processing apparatus 20 according to the present embodiment described in the above embodiment can be incorporated into an imaging apparatus. FIG. 10 is a diagram illustrating an outline of an imaging apparatus 50 according to an embodiment of the present disclosure having the functions of the image processing apparatus 20. The imaging apparatus 50 includes an imaging optical system 51, an imaging device 52, a storage unit 53, a processor 54, and an output interface 55. The imaging optical system 51 and the imaging device 52 are components similar to the imaging optical system 11 and the imaging device 12, respectively, of the imaging apparatus 10 illustrated in FIG. 1. The storage unit 53 and the output interface 55 are components similar to the storage unit 22 and the output interface 24, respectively, of the image processing apparatus 20 illustrated in FIG. 1. The processor 54 is a component having the functions of the processor 13 of the imaging apparatus 10 and the processor 23 of the image processing apparatus 20 illustrated in FIG. 1.

The imaging apparatus 50 captures, using the imaging device 52, a moving image of a subject 40 formed by the imaging optical system 51. The processor 54 performs the same process as that illustrated in the flowchart of FIG. 3 on a moving image output from the imaging device 52. As a result, the imaging apparatus 50 can display, on the display 30, an image in which an image element 48, which is a bounding box such as that illustrated in FIG. 9, is attached to a subject image 42.

In the description of the above embodiment, the information processing apparatus is the image processing apparatus 20, and the sensor is the imaging apparatus 10. The sensor is not limited to an imaging apparatus that detects visible light, and may be a far-infrared camera that obtains an image based on far-infrared radiation, instead. In addition, the information processing apparatus in the present disclosure is not limited to one that obtains a moving image as observed data and that detects a detection target through image recognition. For example, the sensor may be one, other than an imaging apparatus, capable of sensing an observation space, which is an observation target, and detecting a direction and a size of a detection target, instead. The sensor may be, for example, one that employs electromagnetic waves or ultrasonic waves. The sensor that employs electromagnetic waves may be a millimeter-wave radar or a LiDAR (laser imaging detection and ranging). A detection target, therefore, is not limited to a subject whose image is captured. The information processing apparatus may detect a detection target by obtaining observation data including information such as a direction and a size of the detection target output from the sensor. In addition, the display space is not limited to an image space for displaying a moving image, and may be any space capable of displaying a detected detection target in two dimensions.

(Sensing Apparatus Including Millimeter-Wave Radar)

Figure 11:
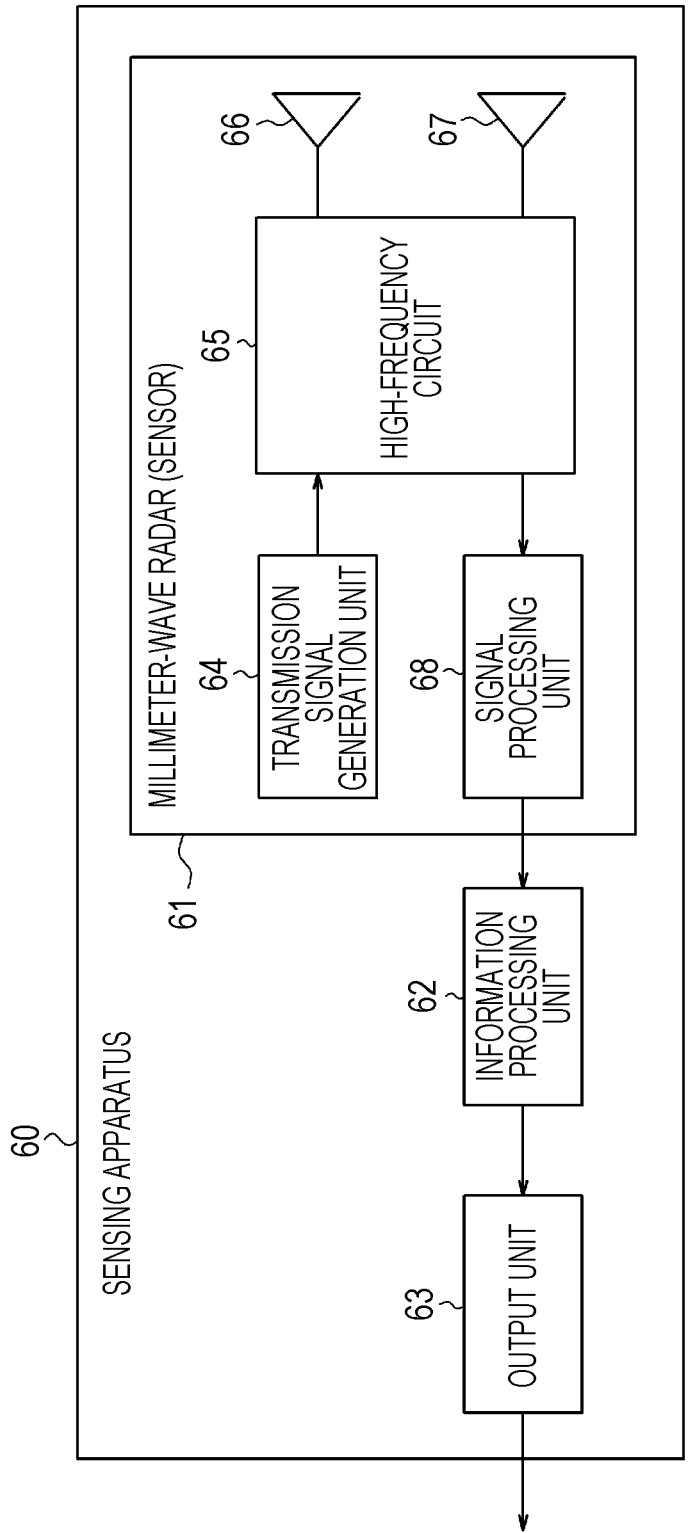
FIG. 11 is a block diagram illustrating an example of a schematic configuration of a sensing apparatus including a millimeter-wave radar.

As an example, a sensing apparatus 60 according to an embodiment will be described with reference to FIG. 11. The sensing apparatus 60 includes a millimeter-wave radar 61, which is an example of the sensor, an information processing unit 62, and an output unit 63. As with the imaging apparatus 10, the sensing apparatus 60 may be mounted on the vehicle at one of various positions.

The millimeter-wave radar 61 can detect a distance, a velocity, a direction, and the like of a detection target using electromagnetic waves in a millimeter-wave band. The millimeter-wave radar 61 includes a transmission signal generation unit 64, a high-frequency circuit 65, a transmission antenna 66, a reception antenna 67, and a signal processing unit 68.

The transmission signal generation unit 64 generates frequency-modulated chirp signals. In chirp signals, frequency increases or decreases at certain time intervals. The transmission signal generation unit 64 is achieved by, for example, a DSP (digital signal processor). The transmission signal generation unit 64 may be controlled by the information processing unit 62.

A chirp signal is subjected to D/A conversion and then subjected to frequency conversion in the high-frequency circuit 65 to become a high-frequency signal. The high-frequency circuit 65 radiates the high-frequency signal toward an observation space as radio waves using the transmission antenna 66. The high-frequency circuit 65 can receive reflected waves, which are the radio waves radiated from the transmission antenna 66 and reflected from a detection target, as a reception signal using the reception antenna 67. The millimeter-wave radar 61 may include a plurality of reception antennas 67, instead. The millimeter-wave radar 61 can estimate a direction of a detection target by detecting phase differences between the reception antennas using the signal processing unit 68. A method for detecting a direction used by the millimeter-wave radar 61 is not limited to one employing phase differences. The millimeter-wave radar 61 may detect a direction of a detection target through scanning with a millimeter-wave beam, instead.

The high-frequency circuit 65 amplifies a reception signal and converts the reception signal into a beat signal indicating frequency differences by mixing a transmission signal with the reception signal. The beat signal is converted into a digital signal and output to the signal processing unit 68. The signal processing unit 68 processes the reception signal and performs a process for estimating a distance, a velocity, a direction, and the like. Because a method for estimating a distance, a velocity, a direction, and the like used by the millimeter-wave radar 61 is known, description of processing performed by the signal processing unit 68 is omitted. The signal processing unit 68 is achieved by, for example, a DSP. The signal processing unit 68 may be achieved by the same DSP as the transmission signal generation unit 64.

The signal processing unit 68 outputs information regarding an estimated distance, an estimated velocity, and an estimated direction to the information processing unit 62 as observation data regarding a detection target. The information processing unit 62 can map the detection target to a virtual space on the basis of the observation data and perform various types of processing. As with the processor 13 of the imaging apparatus 10, the information processing unit 62 is achieved by one or more processors. The information processing unit 62 may control the entirety of the sensing apparatus 60. The processing performed by the information processing unit 62 will be described later in more detail.

The output unit 63 is an output interface that outputs a result of processing performed by the information processing unit 62 to a display apparatus outside the sensing apparatus 60 or an ECU in the vehicle. The output unit 63 may include a communication processing circuit connected to a vehicle network such as a CAN, a communication connector, and the like.

Figure 12:
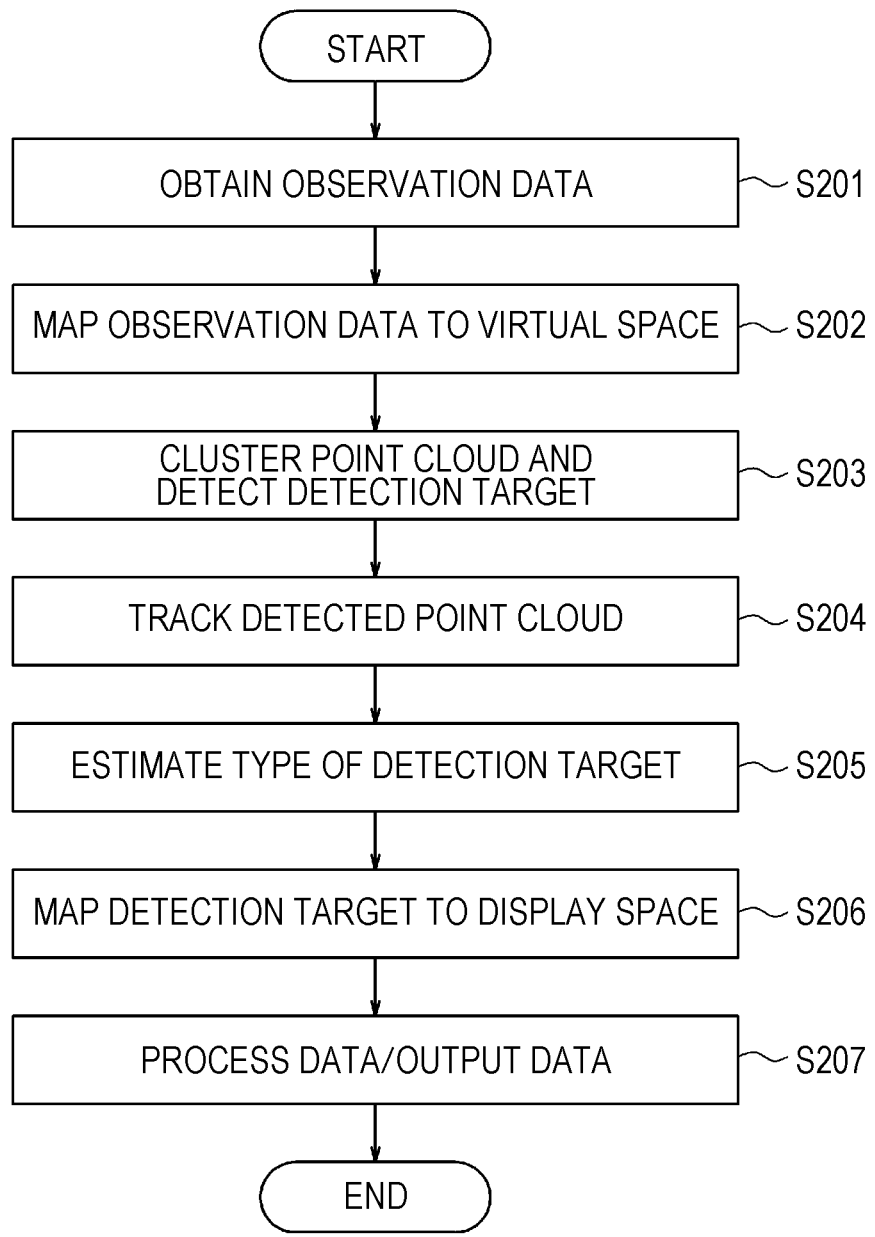
FIG. 12 is a flowchart illustrating an example of a process performed by an information processing unit of the sensing apparatus illustrated in FIG. 11.

A part of the processing performed by the information processing unit 62 will be described hereinafter with reference to a flowchart of FIG. 12.

The information processing unit 62 obtains observation data from the signal processing unit 68 (step S201).

Figure 13:
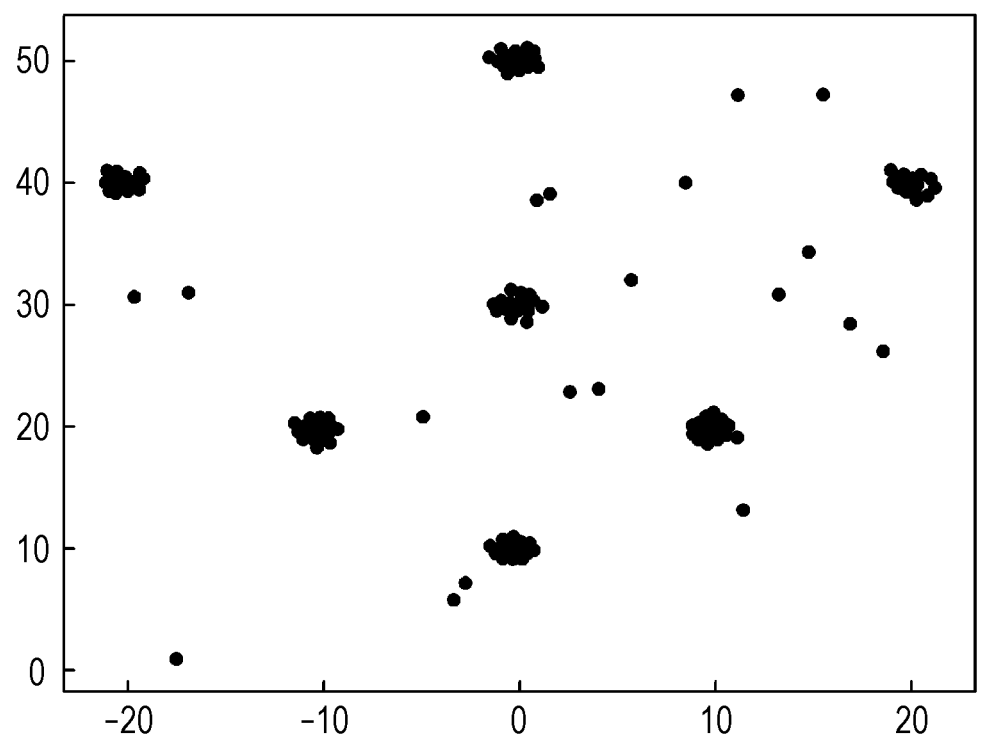
FIG. 13 is a diagram illustrating an example of observation data mapped to a virtual space.

Next, the information processing unit 62 maps the observation data to a virtual space (step S202). FIG. 13 illustrates an example of the observation data mapped to the virtual space. The millimeter-wave radar 61 obtains observation data as information regarding points, each of which includes information regarding a distance, a velocity, and a direction. The information processing unit 62 maps the observation data to a horizontal plane. In FIG. 13, a horizontal axis represents an x-axis direction, which is a lateral direction, in meters with a center thereof defined as 0. A vertical axis represents distance in a depth direction, which is a y-axis direction, in meters with a closest position defined as 0.

Figure 14:
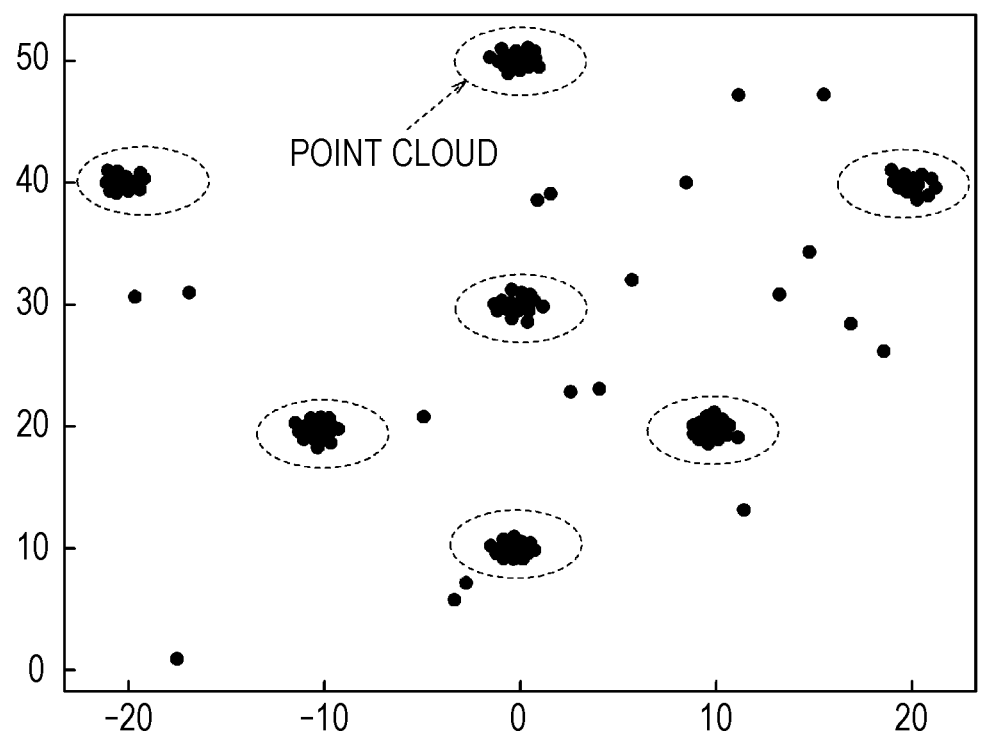
FIG. 14 is a diagram illustrating the observation data illustrated in FIG. 13 subjected to clustering.

Next, the information processing unit 62 clusters each of sets of points in the virtual space and detects a detection target (step S203). The clustering refers to extraction of point clouds, which are sets of points, from data indicating separate points. As indicated by broken-line ellipses in FIG. 14, the information processing unit 62 can extract point clouds, which are sets of points indicating observation data. The information processing unit 62 can determine that a detection target actually exists in a part including a large number of pieces of observation data. The information processing unit 62 can also determine, on the other hand, that observation data corresponding to discrete points is observation noise. The information processing unit 62 may determine whether a set of observation data is a detection target while providing a threshold for the number or density of points corresponding to observation data. The information processing unit 62 can estimate a size of a detection target on the basis of a size of an area occupied by a point cloud.

Next, the information processing unit 62 tracks a position of each of the detected point clouds in the virtual space (step S204). The information processing unit 62 may determine a center of an area occupied by each of the point clouds or an average of coordinates of positions of points included in each of the point clouds as the position of the point cloud. The information processing unit 62 tracks movement of each of the point clouds to detect movement of a detection target in time series.

After step S204, or in parallel with step S204, the information processing unit 62 estimates a type of detection target corresponding to each of the point clouds (step S205). A type of detection target may be "vehicle", "pedestrian", "two-wheeled vehicle", or the like. A type of detection target can be identified using at least one of a velocity, a size, a shape, and a position of the detection target, density of points in observation data, intensity of a detected reflected wave, and the like. For example, the information processing unit 62 can accumulate, in time series, Doppler velocity of a detection target obtained from the signal processing unit 68 and estimate a type of detection target from a pattern of distribution of the Doppler velocity. In addition, the information processing unit 62 can estimate a type of detection target from information regarding the size of the detection target estimated in step S203. Furthermore, the information processing unit 62 can estimate a type of detection target by obtaining intensity of a reflected wave corresponding to observation data from the signal processing unit 68. Because a vehicle, which contains a lot of metal, has a large radar cross-section, for example, intensity of reflected waves is higher than that of a pedestrian, whose radar cross-section is small. The information processing unit 62 may calculate a degree of reliability indicating a probability of estimation along with the type of detection target.

After step S205, the information processing unit 62 maps the detection target from the virtual space to a display space, which is a space for display (step S206). The display space may be a three-dimensional observation space viewed from the user represented in a two-dimensional plane like an image space. The display space may be a two-dimensional space at a time when an observation target is viewed from the z-axis direction (vertical direction). The information processing unit 62 may directly map the observation data obtained from the signal processing unit 68 in step S201 to the display space, instead, without performing steps S203 to S205.

The information processing unit 62 can perform additional data processing on the basis of the detection target mapped to the display space and data obtained in steps S203 to S206, such as the position, velocity, size, and type of detection target (step S207). For example, the information processing unit 62 may sequentially observe sizes of detection targets in the display space and estimate a size of a detection target at the present time on the basis of observed values of the size of the detection target at the present time and estimated values of a size of a past detection target. The information processing unit 62, therefore, can perform a process similar to that illustrated in FIG. 3 using observation data obtained by the millimeter-wave radar 61. The information processing unit 62 can also output the data from the output unit 63 for processing to be performed by other apparatuses (step S207).

As described above, when the millimeter-wave radar 61 is used as a sensor, too, the sensing apparatus 60 can produce similar effects by performing processing similar to that performed when an imaging apparatus is used as the sensor. The sensing apparatus 60 illustrated in FIG. 11 includes the millimeter-wave radar 61 and the information processing unit 62. The millimeter-wave radar and an information processing apparatus having the function of the information processing unit 62, however, may be separately provided, instead.

Although an embodiment of the present disclosure has been described on the basis of the drawings and the examples, it should be noted that those skilled in the art can easily modify or correct the embodiment in various ways on the basis of the present disclosure. It should therefore be noted that the scope of the present disclosure includes such modifications and corrections. For example, the functions or the like included in some components or steps can be rearranged insofar as no logical contradiction is caused. A plurality of components or steps may be combined together or divided. Although the apparatus has been mainly described in the embodiment of the present disclosure, an embodiment of the present disclosure can also be implemented as a method including the steps performed by the components of the apparatus. An embodiment of the present disclosure can also be implemented as a method executed by a processor included in an apparatus, a program, or a storage medium storing the program. It should be understood that the scope of the present disclosure also includes these.

A "mobile object" in the present disclosure may be a vehicle, a ship, or an aircraft. A "vehicle" in the present disclosure may be an automobile or an industrial vehicle, but is not limited to these and may be a railroad vehicle, a vehicle for daily living, or a fixed-wing aircraft that runs on a runway. An automobile may be a passenger vehicle, a truck, a bus, a two-wheeled vehicle, a trolleybus, or the like, but is not limited to these and may be another vehicle that runs on a road. An industrial vehicle may be an industrial vehicle for agricultural or construction purposes. An industrial vehicle may be a forklift or a golf cart, but is not limited to these. A vehicle for agricultural purposes may be tractor, a cultivator, a transplanter, a binder, a combine, or a lawn mower, but is not limited to these. An industrial vehicle for construction purposes may be a bulldozer, a scraper, an excavator, a crane, a dump truck, or a road roller, but is not limited to these. A vehicle may be one powered by a human, instead. Classifications of vehicles are not limited to above. For example, an automobile may be an industrial vehicle that can run on a road, and a plurality of classifications may include the same vehicle. A ship in the present disclosure may be a marine jet, a boat, or a tanker. An aircraft in the present disclosure may be a fixed-wing aircraft or a rotary-wing aircraft.

REFERENCE SIGNS LIST 1 image processing system
10 imaging apparatus (sensing apparatus)
11 imaging optical system
12 imaging device
13 processor
20 image processing apparatus (information processing apparatus)
21 input interface
22 storage unit
23 processor
24 output interface
30 display
40 subject (detection target)
41 image space (display space)
42 subject image
43 representative point
44 reference plane
45 material point
46 virtual space
48 image element
50 imaging apparatus (sensing apparatus)
51 imaging optical system
52 imaging device
53 storage unit
54 processor
55 output interface
60 sensing apparatus
61 millimeter-wave radar (sensor)
62 information processing unit
63 output unit
64 transmission signal generation unit
65 high-frequency circuit
66 transmission antenna
67 reception antenna
68 signal processing unit
100 vehicle (mobile object)

The invention claimed is:

1. An information processing apparatus comprising:
an input interface configured to obtain observation data obtained from an observation space;
a processor configured to:
detect a detection target included in the observation data,
track a position of the detection target in a two-dimensional virtual space as a material point by:
mapping coordinates of the detected detection target in a display space as coordinates of the material point indicating the detection target in the virtual space,
tracking a position and a velocity of the material point indicating the detection target in the virtual space, and
mapping coordinates of the tracked material point in the virtual space as coordinates in the display space, and
track a size of the detection target in the display space by:
sequentially observing sizes of the detection target in the display space, and
estimating a size of the detection target at a present time on a basis of observed values of the size of the detection target at the present time and estimated values of a size of a past detection target; and
an output interface configured to output information based on the coordinates of the material point mapped to the display space and the estimated size of the detection target,
wherein the virtual space is a two-dimensional space consisting of x-coordinates and y-coordinates whose value in a z-axis direction is fixed to a certain value in a coordinate system defined by the x-axis, the y-axis, and the z-axis of real space in which the detection target exists, and
the coordinates of the material point in the virtual space are obtained by mapping coordinates of a representative point at a center of a bottom of the detection target in the display space into coordinates in the virtual space in which the certain value is set to zero.

2. The information processing apparatus according to claim 1,
wherein the processor is configured to track the position and the velocity of the material point using a Kalman filter.

3. The information processing apparatus according to claim 1, wherein:
the size of the detection target includes width and height of the detection target;

estimated values of width and height of a detection target preceding the detection target at the present time are denoted by W(k−1) and H(k−1), respectively;
observed values of width and height of the detection target at the present time are denoted by Wmeans (k) and Hmeans (k), respectively;
the processor is further configured to estimate estimated values W(k) and H(k) of the width and the height of the detection target at the present time using expressions:

$$W(k)=W(k-1)+\alpha(W\text{means}(k)-W(k-1)) \quad (1); \text{ and}$$

$$H(k)=H(k-1)+\alpha(H\text{means}(k)-H(k-1)) \quad (2),$$

where a parameter α falls within a range of 0≤α≤1.

4. The information processing apparatus according to claim 3,
wherein the processor is further configured to estimate accuracy of detecting the detection target included in the observation data and dynamically adjusts the parameter α on a basis of the accuracy of detecting.

5. The information processing apparatus according to claim 3,
wherein the processor is configured to dynamically adjusts the parameter α in accordance with a velocity of movement of the detection target in the observation space.

6. The information processing apparatus according to claim 1,
wherein, in a case where the observed values of the size of the detection target at the present time cannot be obtained, the processor is configured to estimate the size of the detection target at the present time on a basis of only the estimated values of the size of the past detection target.

7. The information processing apparatus according to claim 6, wherein:
the size of the detection target includes width and height of the detection target;
estimated values of width and height of a detection target preceding the detection target at the present time are denoted by W(k−1) and H(k−1), respectively;
estimated values of width and height of a detection target before the preceding detection target are denoted by W(k−2) and H(k−2), respectively; and
the processor is configured to estimated values W(k) and H(k) of the width and the height of the detection target at the present time using expressions:

$$W(k)=W(k-1)+\beta(W(k-1)-W(k-2)) \quad (3); \text{ and}$$

$$H(k)=H(k-1)+\beta(H(k-1)-H(k-2)) \quad (4),$$

where a parameter β falls within a range of 0≤β≤1.

8. A sensing apparatus comprising:
a sensor configured to sense an observation space and obtain observation data regarding a detection target;
a processor configured to:
detect a detection target included in the observation data,
track a position of the detection target in a two-dimensional virtual space as a material point by:
mapping coordinates of the detected detection target in a display space as coordinates of the material point indicating the detection target in the virtual space,
tracking a position and a velocity of the material point indicating the detection target in the virtual space, and
mapping coordinates of the tracked material point in the virtual space as coordinates in the display space, and
track a size of the detection target in the display space by:
sequentially observing sizes of the detection target in the display space, and
estimating a size of the detection target at a present time on a basis of observed values of the size of the detection target at the present time and estimated values of a size of a past detection target; and
an output interface configured to output information based on the coordinates of the material point mapped to the display space and the estimated size of the detection target,
wherein the virtual space is a two-dimensional space consisting of x-coordinates and y-coordinates whose value in a z-axis direction is fixed to a certain value in a coordinate system defined by the x-axis, the y-axis, and the z-axis of real space in which the detection target exists, and
the coordinates of the material point in the virtual space are obtained by mapping coordinates of a representative point at a center of a bottom of the detection target in the display space into coordinates in the virtual space in which the certain value is set to zero.

9. A mobile object comprising
the sensing apparatus according to claim 8.

10. A method for processing information, the method comprising:
obtaining observation data obtained from an observation space;
detecting a detection target included in the observation data;
tracking a position of the detection target in a two-dimensional virtual space as a material point by:
mapping coordinates of the detected detection target in a display space as coordinates of the material point indicating the detection target in the virtual space;
tracking a position and a velocity of the material point indicating the detection target in the virtual space; and
mapping coordinates of the tracked material point in the virtual space as coordinates in the display space; and
tracking a size of the detection target in the display space by:
sequentially observing sizes of the detection target in the display space; and
estimating a size of the detection target at a present time on a basis of observed values of the size of the detection target at the present time and estimated values of a size of a past detection target; and
outputting information based on the coordinates of the material point mapped to the display space and the estimated size of the detection target,
wherein the virtual space is a two-dimensional space consisting of x-coordinates and y-coordinates whose value in a z-axis direction is fixed to a certain value in a coordinate system defined by the x-axis, the y-axis, and the z-axis of real space in which the detection target exists, and
the coordinates of the material point in the virtual space are obtained by mapping coordinates of a representative point at a center of a bottom of the detection target in the display space into coordinates in the virtual space in which the certain value is set to zero.

\* \* \* \* \*